Patented Sept. 24, 1929

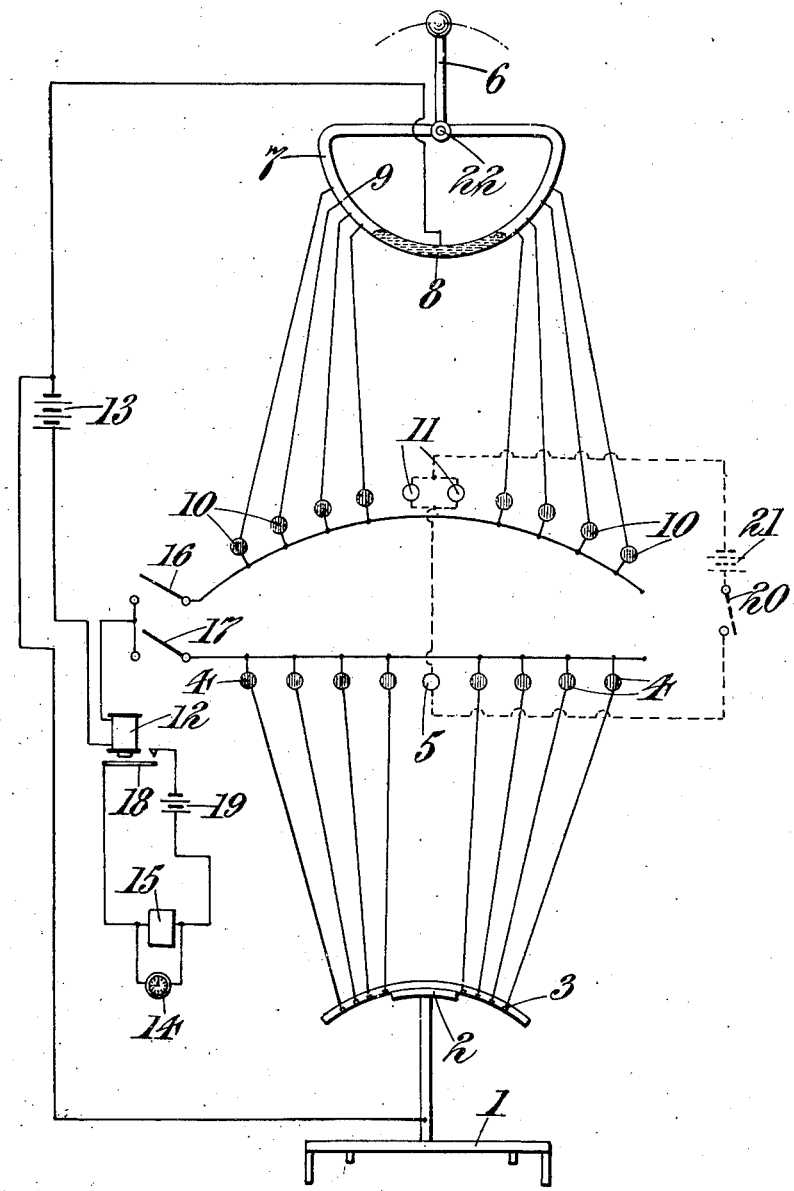

1,729,227

UNITED STATES PATENT OFFICE

GEORGE HANCOCK REID, OF LISTOWEL, IRISH FREE STATE

PSYCHOMOTOR-TESTING APPARATUS

Application filed February 6, 1925, Serial No. 7,263, and in Great Britain February 15, 1924.

This invention relates to apparatus for measuring muscular reaction times or psychomotor response of a person.

It has been proposed to use electric lamp circuits controlled by switches and associated with a time piece for recording the time required by the person to be tested for perceiving an action to be performed and performing the action. In such prior arrangements the switch under the control of the subject has only been adapted to control the indicator which has been set in operation by the tester but has not been adapted to determine which indicator of the series is set in operation. The apparatus according to the present invention is suitable for ascertaining the aptitude of a pilot for flying, but may be used for other purposes.

According to one feature of the present invention, apparatus for testing psychomotor response or analogous purposes comprises a number of electric lamp or indicator circuits the illuminative or indicating effect of which is controlled by switches, one switch being under the control of the tester and the other switch or switches being under the control of the subject and determining which of the lamps or indicators is or are in operation at the commencement of and during the test.

According to another feature of the invention apparatus for testing psychomotor response or analogous purposes comprises one or more devices adapted to simulate or approximate the movements and feel of a joy-stick, a rudder bar or other aircraft control lever, a number of electric lamps or indicators the circuits of which are individually controlled by contact members or equivalents associated with the joy-stick, the rudder bar or the like member operated by the pilot, means such as a switch or switches in series with said contact members and operated by the tester for controlling the lamp or indicator circuits, and a time indicator or recording device for automatically determining the periods of illumination or indication, and if desired the periods of darkness of the lamps.

With these means the time interval which it takes a pilot undergoing a test to restore the joy-stick, rudder bar or the like to the central position from any other position (corresponding to that necessary in an aircraft to restore equilibrium or otherwise) may be automatically measured or ascertained. The time interval is shown by the commencement of the record of the illumination of the lamps by the closing of the series switch or switches by the tester (which may serve to the pilot as the starting signal) and the commencement of the record of darkness of the lamps which indicates the completion of the required action. The time intervals of repeated tests may be set to a known base line or otherwise used to obtain a graph or an average result representing muscular reaction times for each pilot. These indications in conjunction with records of the pilot's general physical condition serve as a means of classifying the pilot according to his capabilities and aptitude for flying.

In one form of construction of the invention by way of example, two rows of electric lamps are used, the upper row of lamps being controlled by a body of mercury in an arcuate tube or by a pendulum device coacting with contacts moving with the joy-stick, and the lower row of lamps being controlled by a contact moving with the rudder bar. The lamps in each row are connectable successively or one at a time, in series with an electric source respectively through the joy-stick and the rudder bar contacts and through a separate switch for each row, so that to light any lamp the joy-stick or the rudder bar or both the joy-stick and the rudder bar contacts as well as the respective series switch or switches must be closed at the same time. The lamps to each side are respectively red and green and indicate different degrees of displacement of the joy-stick and the rudder bar to port or starboard. Central white lamps may be used in separate circuits for giving a white light either continually or else when the joy stick or the rudder bar is central, or at all times. The lamp circuits are associated through an electro-magnetic relay or equivalent device with the control circuit of a tape machine or other time recording instrument adapted to mark a line on a tape or other surface so long as any coloured lamp is lit and to leave a blank on the tape or other surface when the colored lamps are not lit.

To make a test, the pilot is told to move his control stick or rudder bar to a definite position (representing a turn, a bank, or a combination of both for example). This brings the contact on the control member into circuit, while the series switch or switches are left open, so that no lamp is lit. The pilot is then given a warning to be ready to move his controls as soon as one or the other of the coloured lamps are lit so as to switch off the coloured lights, which he can do by moving his controls to a central position. The warning signal is given by the tester closing the series switch or switches which causes some of the coloured lamps to be lit. The closing of the tester's series switch or switches also simultaneuosly starts the tape machine. The time indicated by the mark on the tape taken by the pilot to restore his controls to the central position gives the desired measure as aforesaid.

In the event of the pilot over-shooting the central position in restoring his controls, this is indicated by a break in the record.

Other conditions simulating noises such as occur in aircraft or other devices may be reproduced during a test.

The invention is illustrated by way of example in the accompanying drawings as applied to an arrangement for testing phychomotor responses in relation to flying.

In the arrangement shown diagrammatically in the drawing, a rudder bar 1 carries a metal arm 2 which can pass over a number of contacts 3 according to the angular position of the rudder bar. When the arm 2 engages any contact or contacts 3 one or more coloured lights 4 are illuminated, the number varying as the rudder bar is moved. When the rudder bar is in its central position, only one or more central white lights 5 remain lit.

A control stick 6 can rotate an arcuate tube 7 in any desired vertical plane of movement. If desired the control stick can rotate in more than one plane of movement and more than one arcuate tube 7 may be used. The tube 7 contains a quantity of mercury 8 which passes over a number of platinum contacts 9 according to the angular position of the control stick. When the mercury passes over any contact or contacts 9, one or more coloured lights 10 are illuminated, and as the control stick is centralized the coloured lights 10 are extinguished, one by one until one or more central white lights 11 remain.

A relay 12 is, on the one hand, in a circuit including the mercury 8 the lamps 10 and a battery 13, and on the other hand in a circuit including the arm 2 the lamps 4 and the battery 13. The relay 12 operates a d'Arsonval clock 14 and a tape machine 15, so that when any coloured lamp 10 or 4 is lit the timing devices 14 and 15 are recording, and when the rudder bar and the control stick are centered the timing devices are automatically stopped. The circuits from the relay 12 to the lamps 4 and 10 include two switches 16, 17, which are mounted so that either can be moved for use with hand or foot movements of the control column or rudder bar respectively, or for combined movements thereof.

The timing devices 14, 15 are included in a circuit comprising a contact bar 18 and a battery 19.

The white lights 5, 11 are included in a circuit comprising a switch 20 and a battery 21. Closing of the switch 20 will result in the illumination of these lights. If desired, these lights may, also, like the lights 4 and 10, be controlled so as to become illuminated only when the joy stick or the rudder bar is central.

The control column and the arcuate tube 7 are pivotally mounted at 22 on a suitable support.

The apparatus may be mounted in an aeroplane fuselage.

By way of example, the method of investigating psychomotor responses with the apparatus is as follows:—

The subject is seated in the fuselage with his feet on the rudder bar 1 and his hands on the control stick 6. The two switches 16 and 17 under the control of the tester being open, the rudder bar or control stick or both are placed in a position for say a right hand spin, that is to say the bar 2 is moved to the right and the control stick 6 is moved to the left. The subject is then told to centralize his controls as soon as the coloured lights are illuminated, which is effected when the switch 16 or the switch 17 or both are closed.

For concreteness, let it be assumed that the control stick 6, for example, is set by the tester full over to the left, as viewed in the drawing. When the tester closes the switch 16, all the colored lights 10 on the left will become illuminated. This is the signal for the subject to pull control 6 over to the right, toward the central position indicated by the lights 11 (or towards the central position indicated by the lights 5, if the subject is similarly operating the rudder bar 1). As the control is moved from the left towards the right, the four lamps 10 become switched off, one after the other, so that they are all off when the control is in its central position. But the subject does not always succeed in centralizing his controls on the first trial. He will usually overshoot to the right, causing one or more of the lights on that side to become switched off, one after the other. He then moves the control over to the left again, and so on. In practice, he may overshoot the central position, back and forth, many times before the controls are finally centralized and kept centralized. The successive switching on and off of the lights gives the subject a visual indication as to the manner in which he is performing his test and how far he overshoots the central position on each trial, and this serves him as a guide as to which direction and how far he must move the controls each time in order to centralize them.

At every movement of the controls to one side or the other of the central position, the circuit is broken, and this causes corresponding breaks in what would otherwise appear on the record as a continuous line. The lengths of the lines between the breaks vary in accordance with the degrees of successive displacement of the controls from the central position and are, therefore, proportional to the number of lamps lit.

The test is thus rendered both qualitative and quantitative. The quality of the test is indicated by the successive lines and the breaks between them, which show how many times during the test the subject has overshot the central position and to what extent said position was overshot. The test is also quantitative, however, in that the record indicates the duration of the test, or the time taken by the subject, starting from a given position of the control lever, to restore the latter to the central position and, what is more important, keeping it there.

The time taken for the subject to restore the controls to the central position is recorded by the clock 14 and the tape machine 15. Graphs are prepared of several tests so as to form a time curve of individual performances of hands and feet separately or collectively, from which a main time curve can be prepared. Results show that the time taken for effecting centralization of the controls is an indication of the suitability of the subject's hand and foot performances for flying purposes or other purposes wherein psychomotor response is involved.

Although electric lamps have been shown in the example illustrated, it will be understood that any other electric indicating devices may be used instead of the lamps; further the apparatus may be used for testing purposes not associated with flying, as with other types of vehicles.

I claim:—

1. Apparatus for testing psychomotor response or for analogous purposes comprising an electric circuit, two independently operable switches in series therein, one of the switches being adapted to be operated after the other switch, time recording means controlled by one of the switches for recording the interval between operations of the switches, and electrical indicating means in said circuit.

2. Apparatus for testing psychomotor response comprising a hand-operated control member, a foot-operated control member, and two rows of electric lamps, one of said rows being controlled by a pendulum device coacting with contacts moving with said hand-operated control member and the other of said rows being controlled by a contact moving with said foot-operated control member, the lamps in each row being connected successively or one at a time in series with an electric source through the hand-operated control-member or the foot-operated-control-member contacts and through a separate switch for each row, so that to light any lamp either or both the hand-operated-control-member and the foot-operated-control-member contacts as well as the separate switch must be closed at the same time.

3. Apparatus for testing psychomotor response comprising a hand-operated control member, a foot-operated control member, and two rows of electric lamps, one row being controlled by a body of mercury in an arcuate tube coacting with contacts moving with said hand-operated control member and the other row being controlled by a contact moving with the foot-operated control member, the lamps in each row being connected successively or one at a time in series with an electric source through the hand-operated-control-member or the foot-operated-control-member contacts and through a separate switch for each row, so that to light any lamp either or both the hand-operated-control-member and the foot-operated-control-member contacts as well as the separate switch must be closed at the same time.

4. Apparatus as claimed in claim 2 wherein the electric lamp circuits are associated through an electromagnetic relay with the control circuits of a time-recording instrument adapted to make a mark on a surface so long as any one of certain of the lamps is lit and to leave a blank on the surface when the other lamps are lit.

5. Apparatus for determining the time interval which it takes a person undergoing a test to restore a control lever to a central position from any other position, corresponding to that necessary in an aircraft to restore equilibrium or otherwise, comprising a control lever, a recording device that is normally ineffective operatively connected therewith, means for rendering the recording device effective, and means for rendering the recording device ineffective in the event of the person undergoing the test overshooting the central position in restoring the control lever.

6. Apparatus for testing psychomotor response or for analogous purposes comprising a normally ineffective electric indicator for indicating the moment when to perform a predetermined action, different parts of the indicator being adapted to indicate different degrees of performance of the action, and two independently operable switches in series adapted to control same, one of the switches being under the control of the tester and the other under the control of the subject, the switch under the control of the tester being adapted to render the indicator effective to indicate the moment when to perform the predetermined action, and the switch under the control of the subject determining which part of the electric indicator is in operation at the commencement of and during the test.

7. Apparatus for testing psychomotor response or for analogous purposes comprising an electric circuit, two independently operable switches in series therein, one of the switches being under the control of the tester and the other under the control of the subject, time recording means for recording the interval between operations of the switches and electrical indicating means in said circuit, the switch under the control of the subject determining which part of the electric indicator or indicators is in operation at the commencement of and during the test.

8. Apparatus as claimed in claim 2 wherein the electric lamp circuits are associated through an electromagnetic element with the control circuit of a time recording instrument adapted to make a record so long as any one of certain of the lamps is lit and not to make a record when another of the lamps is lit.

9. Apparatus for testing psychomotor response comprising a row of electric lamps, an electric circuit for the lamps a switch for closing the circuit to illuminate the lamps a movable control element associated therewith and adapted to be moved between limits of movement, means whereby positioning of said control element intermediate of its limits of movement breaks the circuit of said lamps to extinguish them independently of the controlling switch, and means for recording the time-lapse between the illumination and extinguishing of the lamps.

10. Apparatus for testing psychomotor response comprising a plurality of rows of lamps, a time recorder and a switch controlling lamps and recorder, and secondary controlling means comprising a control member the position of which determines which if any of the lamps appear illuminated and predetermined positioning of which causes the time recorder to commence its operation.

11. Apparatus for testing psychomotor response comprising a hand-operated control member, a foot-operated control member, two electric indicating devices, each control member having a contact member for controlling one of the indicating devices, and a separate switch under the control of the tester for controlling each indicating device.

12. Apparatus for testing psychomotor response comprising, in combination, means adapted to be actuated by the subject for testing his psychomotor response, means controlled by the first-named means for indicating to the subject when the act which he is called upon to perform is successfully performed or how far from the completion of the performance he may be at any instant during his endeavor to perform the act, and means operatively connected with the second-named means for recording the time which the subject takes to perform the act and the manner in which the act has been performed.

13. In apparatus for testing psychomotor response, an electric indicator which is in constant operation, a plurality of electric indicators arranged on one side and the other of said first mentioned indicator, said plurality of indicators being arranged in series in the same electric circuit, and a control member adapted to occupy a normal position when the act which the subject under test is called upon to perform is successfully completed and to be operated on one side and the other of the normal position by him and adapted to cut out or include in the said circuit in succession the said plurality of indicators, the first-named indicator being adapted to indicate the successful completion of the performance when the control member occupies the normal position, and the other indicators indicating in what position said control member is situated relative to its normal position at any instant during the performance.

14. Apparatus for testing psychomotor response comprising, in combination, a plurality of electric devices adapted to be included in series in the same circuit but which are not so included until the test is commenced, a switch under the control of the tester for including said devices in the said circuit, a control member operated by the subject under test for cutting out or including said devices from or in the said circuit, means for recording the duration of the act which the subject under test is called upon to perform and also the manner in which it has been conducted from the commencement to its ultimate performance, and means operatively connected to said recording means adapted to be included in the said circuit only when one or more of said electric devices are in circuit so that said recording means is operated by said second-named means.

15. In apparatus for testing psychomotor response, means under the control of the subject for indicating to the latter the manner in which he is performing the act which he is called upon to perform, recording means, and means for operatively connecting the first-named means to the recording means, so that the manner in which the subject is performing the said act is also recorded by the recording means.

16. In apparatus for testing psychomotor response or for analogous purposes comprising an electric indicator, a switch, under the control of the tester, in series with the indicator and adapted to control same, and an independently-operated switch under the control of the subject which also controls the indicator and determines which part of the indicator is in operation at the commencement of and during the performance of the act which he is called upon to perform, when the latter is performed, and how far the act is from complete performance.

17. In apparatus for testing psychomotor response or for analogous purposes comprising an electric indicator, a switch, under the control of the tester, in series with the indicator and adapted to control same, an independently operated switch also controlling the indicator, and a simulation aircraft control element associated with the last mentioned switch which latter determines which part of the electric indicator is in operation at the commencement of and during the performance of the act which the subject under test is called upon to perform, when the latter is performed, and how far the act is from complete performance.

18. Apparatus for testing psychomotor response or for analogous purposes comprising an electric circuit, independently operable switches in series therein, electrical indicating means in the circuit, and time-recording means for recording the interval between operations of the switches and said electrical indicating means, one of said switches, which is under the control of the subject, determining which part of the electric indicating means is in operation at the commencement of and during the performance of the act which the subject under test is called upon to perform, when the latter is performed, and how far the act is from complete performance.

19. In apparatus for testing psychomotor response or for analogous purposes comprising one or more devices adapted to simulate the movement and feel of a control-stick or rudder bar of an air craft, a number of electric indicator circuits which are individually controlled by contact members operable by the control-stick or the rudder bar, operated by the subject, said contacts being associated with the circuits operable by the tester for independently controlling said circuits, and a recording device for automatically determining the periods of indication, the intervals occurring between indications during the performance of the act which the subject under test is called upon to perform, and the number of indications which take place before the act is completely performed.

20. In apparatus for determining the time interval which it takes a person undergoing a test to restore a control member to a central position from any other position, a number of electric lamps in series in the same circuit, switches in said circuit, and a time-recorder which is started at the commencement of illumination of said lamps by the closing of one of said switches and is stopped at the extinction of said lamps by the independent operation of the control member, which latter determines which of the lamps is in operation at the commencement of and during the performance of the act which the subject under test is called upon to perform.

21. Apparatus for testing psychomotor response comprising two electric indicator devices, a hand control member, contacts moving therewith, a device operated by said member, coacting with said contacts and controlling one of said indicator devices, a foot-control member, a contact moving therewith, said foot-control member being adapted to control the other indicator device, a separate switch for each indicator, and an electric source, one or the other indicator being connected successively or one at a time in series with said electric source through the hand- or foot-control-member contacts through one or the other separate switch so that to work any indicator either or both the hand-control member and the foot-control-member contacts as well as the respective separate switch must be closed at the same time.

22. Apparatus for testing psychomotor response comprising two rows of electric lamps, contacts, an arcuate tube containing mercury which controls one of said rows and coacts with said contacts, a hand-control member for moving said contacts, a foot-control member, a contact moving therewith and adapted to control the other row of lamps, an electric source, a separate switch for each row, the lamps in each row being connected successively or one at a time in series with an electric source through the foot-or hand-control-member contacts and through said separate switch for each row, so that to light any lamp either or both the hand-control-member and the foot-control-member contacts as well as the separate switch must be closed at the same time.

23. Apparatus for testing psychomotor response comprising means adapted to be moved by the subject for testing his psychomotor response, the said means being movable over a predetermined range of movement from one position to a second position to complete a test, means controlled by the first-named means for indicating the degree of movement over the range of the movable means, and means controlled by the first-named means for indicating the time taken to complete the test.

24. Apparatus for testing psychomotor response or for analogous purposes comprising an electric circuit, an indicator in the circuit for indicating the moment when a subject shall perform a predetermined action, the circuit being normally open so as to render the indicator ineffective, means under the control of the tester for closing the circuit to render the indicator effective to indicate the moment for the subject to perform the predetermined action, and a control device under the control of the subject for opening the circuit.

25. Apparatus for testing psychomotor response or for analogous purposes comprising an electric circuit, an indicator in the circuit for indicating the moment when a subject shall perform a predetermined action, the circuit being normally open so as to render the indicator ineffective, means under the control of the tester for closing the circuit to render the indicator effective to indicate the moment for the subject to perform the predetermined action, a control device under the control of the subject for opening the circuit, and means controlled by the first-named means for indicating the time elapsed from the said moment until the circuit is opened.

26. Apparatus for determining the time interval which it takes a subject undergoing a test to restore a control device to a central position from any other position, comprising an electric lamp, a switch under the control of the tester for lighting the lamp, a time recorder that is normally ineffective to record time, means whereby the recorder commences recording time with the operation of the switch, and means whereby the lamp becomes extinguished and the recorder is stopped operating upon the operation of the control device.

27. Apparatus for testing psychomotor response or for analogous purposes comprising a plurality of normally ineffective electric indicators for indicating the moment when the person to be tested is to perform any one of a plurality of predetermined actions, a control switch for rendering the indicators effective, and a switch in series with the first-named switch and operable independently of the control switch by the person to be tested to a degree corresponding to that predetermined action that corresponds to the indicator.

28. Apparatus for testing psychomotor response or for analogous purposes comprising a device adapted to occupy at different times a central position and positions on each side of the central position, means for actuating the device, and means controlled by the device for measuring the time taken to actuate the device from a position on one side of the central position to the central position and to maintain it at the central position.

29. Apparatus for testing psychomotor response or for analogous purposes comprising a device adapted to occupy a plurality of positions, means for actuating the device to change the position of the device, means operable when the device occupies any one of a plurality of its positions for indicating the moment when to commence to actuate the device, and means controlled by the device for measuring the time elapsed from the said moment until the device has been actuated to another position.

30. Apparatus for testing psychomotor response or for analogous purposes comprising means for indicating the moment when to perform any one of a plurality of predetermined actions, means for performing the said one action, and means controlled by the performing means for measuring the time elapsed from the said moment until the said one action has been performed.

31. Apparatus for testing psychomotor response or for analogous purposes comprising a device adapted to occupy two positions, an indicator adapted to give one indication when the device occupies one of its positions and another indication when the device occupies its other position, means for actuating the device from the said one position to the said other position to cause the indicator to change from the said one indication to the said other indication, and means controlled by the device for recording the actuation of the device simultaneously with the change from the said one indication to the said other indication.

32. Apparatus for testing psychomotor response or for analogous purposes comprising a device adapted to occupy more than two positions, a plurality of indicators each associated with one of the positions and each being adapted to give one indication when the device occupies the corresponding position and another indication when the device occupies a position different from the corresponding position, and means for actuating the device from one of the positions to any other of the positions.

33. Apparatus for testing psychomotor response or for analogous purposes comprising a device adapted to occupy two positions, means for actuating the device, means operable when the device occupies one of its positions for indicating the moment when to commence to actuate the device, and means controlled by the device for measuring the time elapsed from the said moment until the device has been actuated to the said other position.

34. Apparatus for testing psychomotor response or for analogous purposes comprising a device adapted to occupy a plurality of positions, means for actuating the device, and means controlled by the device for measuring the time taken to actuate the device from one of the positions to another of the positions.

35. Apparatus for testing the psychomotor response of would-be aviators comprising a foot-control member adapted to simulate the movement and feel of a rudder bar, a hand-control member adapted to simulate the movement and feel of a joy stick, the control members being each freely operable to and beyond each side of a central position and required to be restored by the foot and the hand, respectively, of the subject to be tested to the said central positions, and means controlled by the control members for measuring the time taken by the subject to restore both the foot bar and the joy stick from positions on one side of the said respective central positions to the said respective central positions and to maintain them in the said respective central positions.

36. Apparatus for determining the time interval which it takes a person undergoing a test to restore a joy-stick, rudder bar or other control lever to a central position from any other position, comprising a control lever, one or more electric lamps, a switch or switches for lighting or extinguishing the lamp or lamps, a normally ineffective time-recorder, means for rendering the recorder effective at the commencement of illumination of the said one or more electric lamps by the closing of the said switch or switches, and means under the control of the control lever for actuating the switch or switches for rendering the recorder ineffective at the extinction of the said lamp or lamps.

37. Apparatus for testing psychomotor response comprising, in combination, means adapted to be actuated by the subject in order that he may perform an act for the testing of his psychomotor response, means for indicating the moment when to commence to actuate the first-named means in order to commence the performance of the said act, and means controlled by the first-named means for indicating when the said act has been successfully performed or how far from the completion of the performance the subject may be at any instant during his endeavor to perform the said act.

In witness whereof I have signed this specification.

GEORGE HANCOCK REID.